J. MAGEE.
Cooking Stove.
No. 80,867. Patented Aug. 11, 1868.
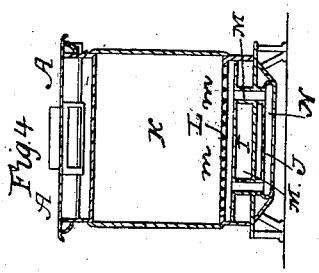
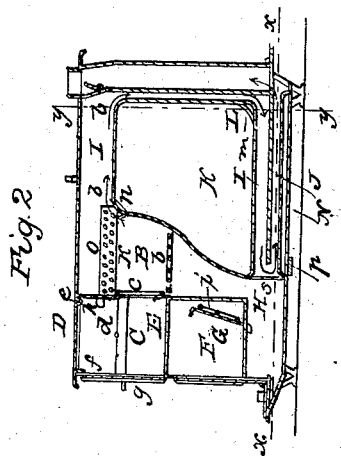
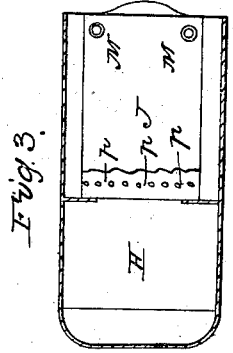
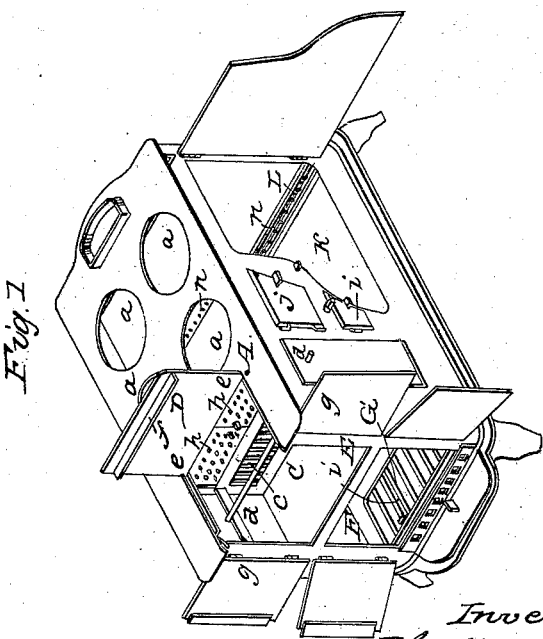
Witnesses
Inventor

United States Patent Office.

JOHN MAGEE, OF CHELSEA, MASSACHUSETTS, ASSIGNOR TO MAGEE FURNACE COMPANY.

Letters Patent No. 80,867, dated August 11, 1868.

COOKING-STOVE.

The Schedule referred to in these Letters Patent and making part of the same.

TO ALL WHOM IT MAY CONCERN:

Be it known that I, JOHN MAGEE, of Chelsea, in the county of Suffolk, and State of Massachusetts, have invented certain Improvements in Cooking-Stoves, of which the following is a full, clear, and exact description, reference being had to the accompanying drawings, making part of this specification, in which—

Figure 1 is a perspective-view of a cooking-stove with my improvements applied thereto.

Figure 2 is a longitudinal vertical section through the centre of the same.

Figure 3 is a horizontal section on the line $x$ $x$ of fig. 2.

Figure 4 is a transverse vertical section on the line $y$ $y$ of fig. 2.

My invention consists in a roasting-closet placed in front of the open grate of a cooking-stove, and also, in connection with the above, my invention consists in a warming-closet situated under the roasting-closet, the top of the latter being either stationary or provided with a lid, which may either be slid or swung open, or removed therefrom for convenience in inserting and removing the article to be placed therein.

To enable others skilled in the art to understand and use my invention, I will proceed to describe the manner in which I have carried it out.

In the said drawings, A represents the top plate of a cooking-stove, provided with holes, $a$ $a$ $a$ $a$, for the reception of the ordinary pots or other utensils to be used.

B is the fire-box, in the bottom of which is placed a grate, $b$, which may be rocked to one side when the cinders or ashes are to be removed therefrom, the front of the fire-box consisting of a series of stationary or removable grate-bars, $c$, between which the heat from the fire is directly conveyed into a compartment or closet, C. Upon a spit, $d$, therein is placed the meat, fowl, or other article to be roasted, the spit being turned by operating a crank fitting over one of its extremities projecting outside.

D is a lid, hinged or otherwise pivoted at $e$ to the plate A, and forms the greater portion of the top of the roasting-closet C, the lid being made to swing open for greater convenience in inserting and removing the meat or other article therefrom. This lid D is provided with a projecting ledge, $f$, against which (when the lid is closed) abut the upper edges of the doors $g$ $g$, which open and close the front of the roasting-closet C.

$h$ $h$ are perforated doors placed over the open grate-bars $c$, and form the upper portion of the back of the said closet, these doors serving to create a draught for ventilating the roasting-closet, and also for burning the gases arising from the fuel in the fire-box B.

E is a flat plate forming the bottom of the roasting-closet, said plate occupying the same position as that of a hearth in an ordinary high-hearth stove, and also forming the top of a compartment used as a warming-closet, F, for keeping cooked articles warm after being removed from the oven, roasting-closet, or utensils belonging to the stove.

G is a lid, hinged or otherwise pivoted to the plate forming the bottom of the warming-closet, it being swung open into the position shown in fig. 2, for convenience in removing ashes, &c., from the ash-pit H, and for better obtaining access through the opening 5 to the flues I J under the oven K.

$i$ is a metal stand, upon which are placed the dishes to be kept warm.

In the foregoing description, I have spoken of the roasting-closet being provided with a lid, D, made to swing open at its top, but a stationary or removable or sliding lid may be used, if preferred, and the doors $g$ $g$ of the roasting-closet may be dispensed with, and one or more stationary or sliding or swinging pieces may be substituted therefor. Furthermore, the top and front of the roasting-closet may be hinged or pivoted together, and the lid D be connected at $e$, as before, to the top plate A, the lower plate covering the front, swinging freely on the lid D.

I do not limit myself to the exact construction of the warming-closet when used in connection with the roasting-closet, as numerous modifications of the former may be made, or it may be dispensed with, and the roasting-closet used independently thereof, without departing from the spirit of my invention.

I am aware that a roasting-oven, provided with flues at its top or sides, or both, has been placed in front of a closed fire, a plate being interposed between them, but by this construction it is evident that the heat imparted to the oven is not so great, as the rays are not communicated directly thereto.

What I claim as my invention, and desire to secure by Letters Patent, is—

A roasting-closet, C, with a movable lid at its top, when said roasting-closet is placed over or above a warming-closet, F, and in front of the fire-chamber of a cooking-stove, substantially as and for the purpose set forth.

JOHN MAGEE.

Witnesses:
 N. W. STEARNS,
 W. J. CAMBRIDGE.